US006547399B2

United States Patent
Knox

(10) Patent No.: US 6,547,399 B2
(45) Date of Patent: *Apr. 15, 2003

(54) IMAGE ENGINE HAVING MULTIPLE IMAGE SOURCES WITH DIFFERENT RESPONSE TIMES FOR COLOR OPERATION

(75) Inventor: Richard M. Knox, Houston, TX (US)

(73) Assignee: Duke University, Durham, NC (US)

(*) Notice: Subject to any disclaimer, the term of this patent is extended or adjusted under 35 U.S.C. 154(b) by 0 days.

This patent is subject to a terminal disclaimer.

(21) Appl. No.: 10/100,537

(22) Filed: Mar. 18, 2002

(65) Prior Publication Data

US 2002/0101569 A1 Aug. 1, 2002

Related U.S. Application Data

(62) Division of application No. 09/829,817, filed on Apr. 10, 2001, now Pat. No. 6,379,011, which is a division of application No. 09/239,416, filed on Jan. 28, 1999, now Pat. No. 6,217,174.

(51) Int. Cl.$^7$ .................. G03B 21/00; G03B 21/26; G03B 21/28; G02F 1/1335; H04N 9/12

(52) U.S. Cl. .................. 353/31; 353/30; 353/34; 353/37; 353/81; 349/5; 349/9; 348/743

(58) Field of Search .................. 353/31, 34, 37, 353/84, 88, 89, 20, 81, 30; 348/742, 743; 359/618, 630, 722, 634, 639, 291, 298, 885, 561, 583, 589, 487, 489; 349/5, 9

(56) References Cited

U.S. PATENT DOCUMENTS

| | | | | |
|---|---|---|---|---|
| 4,425,028 A | * | 1/1984 | Gagnon et al. | 350/337 |
| 4,544,237 A | * | 10/1985 | Gagnon | 350/331 |
| 5,404,076 A | * | 4/1995 | Dolan et al. | 313/572 |
| 5,467,146 A | | 11/1995 | Huang et al. | 348/743 |
| 5,557,343 A | | 9/1996 | Yamagishi | 348/781 |
| 5,606,220 A | * | 2/1997 | Dolan et al. | 313/637 |
| 5,686,931 A | * | 11/1997 | Funfschilling et al. | 345/88 |
| 5,706,061 A | | 1/1998 | Marshall et al. | 348/743 |
| 5,825,542 A | | 10/1998 | Cobb et al. | 359/487 |
| 5,833,338 A | | 11/1998 | Barak | 353/20 |
| 5,833,360 A | | 11/1998 | Knox et al. | 362/293 |
| 5,905,545 A | * | 5/1999 | Poradish et al. | 348/743 |
| 5,921,650 A | | 7/1999 | Doany et al. | 353/31 |
| 5,982,541 A | | 11/1999 | Li et al. | 359/497 |
| 5,986,721 A | * | 11/1999 | Jones, Jr. et al. | 348/743 |
| 6,002,452 A | * | 12/1999 | Gagnon et al. | 350/337 |
| 6,005,332 A | * | 12/1999 | Mercer | 313/113 |
| 6,086,208 A | | 7/2000 | Glenn | 353/31 |
| 6,217,174 B1 | * | 4/2001 | Knox | 353/31 |
| 6,271,895 B2 | * | 8/2001 | Takagi et al. | 349/11 |
| 6,275,271 B1 | * | 8/2001 | Hitomi et al. | 348/743 |
| 6,377,236 B1 | * | 4/2002 | Karamoto | 345/102 |
| 6,379,011 B1 | * | 4/2002 | Knox | 353/31 |
| 6,390,626 B2 | * | 5/2002 | Knox | 353/20 |
| 6,445,505 B1 | * | 9/2002 | Morgan | 359/618 |
| 6,490,017 B1 | * | 12/2002 | Huang et al. | 350/337 |
| 2002/0024618 A1 | * | 2/2002 | Imai | 348/743 |

* cited by examiner

Primary Examiner—Russell Adams
Assistant Examiner—Melissa J Koval
(74) Attorney, Agent, or Firm—Myers Bigel Sibley & Sajovec

(57) ABSTRACT

A full color image projection system is provided using two non-color-specific image sources and color-specific filters. The system is capable of projecting an image using one primary color from one image source and the other two primary colors from another image source. The system uses slower speed image sources than would be required with one source alternating between three colors, and exhibits higher resolution than would be obtained from a color-specific image source.

16 Claims, 9 Drawing Sheets

IMAGE ENGINE HAVING MULTIPLE IMAGE SOURCES WITH DIFFERENT RESPONSE TIMES FOR COLOR OPERATION

CLAIM FOR PRIORITY AND CROSS-REFERENCE TO OTHER APPLICATIONS

This application claims priority to and is a divisional of application Ser. No. 09/829,817 filed Apr. 10, 2001, now U.S. Pat. No. 6,379,011 which is a divisional of parent application Ser. No. 09/239,4 16 filed Jan. 28, 1999, now U.S. Pat. No. 6,217,174 the disclosures of which are hereby incorporated herein by reference.

BACKGROUND OF THE INVENTION

1. Field of the Invention

The invention relates to projection displays, and more particularly to a technique for faster color display from liquid crystal display (LCD)-generated images

2. Description of the Related Art

With the ever increasing graphical nature of computer user interfaces, improving image display devices by improving the size and quality of displayed images generated by digital and analog signals is important. The two most popular image display devices are the cathode ray tube (CRT) and the LCD. Although large screen CRTs are available, they often are bulky. Slimmer screens can be made using various image generating devices, such as the LCD, polymer dispersed liquid crystal displays (PDLCDs), or other LCD technology, but, at present, screen size is limited by manufacturing considerations.

Projection of an image created by digital or analog signals, rather than by direct imaging, can be an efficient and economical way to increase display size, provided the overall system size is practical and image quality is acceptable. Projection of color images, however, presents some problems associated with speed limitations of the particular device used to convert the image signal to an image that can be displayed.

In color displays, there are three major systems for producing different colors and color brightness. One system uses color-specific pixels, in which each pixel transmits only one of the red, green, or blue components needed for a full color image. In this system, the pixels are arranged in groups of red, green, and blue. A particular color is achieved in an area of the pixels by turning "on" or "off" the appropriate pixels in that area. For example, if purple is the desired color, the green pixels in the area would remain off while the red and blue pixels would be turned on. Displayed image brightness may also be controlled by turning the pixels on and off. If bright purple is desired, for example, the red and blue pixels in the area would remain on for longer periods of time than for a less bright purple. The red and blue pixels are turned on and off at a higher rate for the bright purple than for the less bright purple. The greater the percentage of "on" time, the brighter the color.

Another color display system is similar to the system described above in that each pixel transmits only one of the primary colors. In this second system, the pixels are arranged in groups of red, green, and blue. To achieve a particular color in a pixel area, appropriate pixels in the area are turned on or off. Brightness is controlled by varying the amount of light transmitted by an "on" pixel, rather than by turning off some of the pixels. This system provides better resolution than a system that leaves pixels unilluminated to achieve shades of displayed color.

As will be appreciated, systems that rely on color-specific pixels may significantly diminish image resolution compared to systems that employ any of their pixels to create an image at any one time, irrespective of color requirements. Moreover, systems that are subpixelated, color-specific, and that have a limited subpixel size may exhibit diminished image resolution compared to systems that have smaller subpixel size. At some point, however, reducing subpixel size may be prohibitive in terms of cost. Cost may also be a problem for systems that use three imagers (e.g., LCDs), one each for red, green, and blue light, and a dispersing element, such as a prism, to separate the colored light from white.

One technique that avoids both subpixelation and the use of three imagers in colored displays is known as field sequential color. Field sequential color systems comprise the other major system for producing different colors and color brightness. Each pixel transmits or reflects red, green, and blue light sequentially in time. When the sequence is transmitted sufficiently fast, the human brain integrates and perceives the three light colors as a single blended color, determined, to a certain extent, by the relative proportion of the color inputs. If the transmission is not fast enough, however, the image may appear smeared and the color integration incomplete, causing so-called "rainbow effects." To reduce such effects, the three colors must be sequenced at a relatively high rate within a video frame. For example, with a frame rate of approximately 60 to 200 Hz, the corresponding three-color (subframe) change rate must be approximately three times this range, or 180 to 600 Hz.

In sequential color displays, color hue and brightness are usually controlled in the time domain. This arises because most LCDs or other imagers capable of the necessary speeds are bi-stable devices, not analog. Digital devices provide only fully-on and fully-off periods, while analog devices can vary the intensity substantially continuously between the fully-on and fully-off states. For example, with a digital device, if a bluish-purple hue is desired from a certain pixel for a time period, the pixel is electronically controlled to transmit blue light longer than red light, and to transmit no green light during that time period. Pulse width modulation may be used to provide such electronic control. Adding pulse width modulation to the requirement for high speed sequencing may, however, present a practical limitation, because the LCD must be capable of very high on-off switching rates. As an example, assume that 24-bit color is provided, i.e., 8-bits or 256 color levels or values each for red, green, and blue. If analog LCDs could be used, then at approximately 300 to 600 Hz, a different analog voltage level would have to be applied to each pixel, each voltage assuming one of 256 values corresponding to the 256 color values. Simultaneously, a color filter would have to be switched to pass light corresponding only to the color to be displayed. The problem, as noted above, is that most analog displays are too slow for this type of system.

Some ferroelectric LCDs (or FLCDs), on the other hand, are bi-stable devices, and are capable of very high switching rates. They can be used to provide the equivalent of analog color levels via pulse width modulation switching in the time domain. For example, each 300th to 600th of a second subframe interval may be further divided into 6-bit time slots, or 64 time divisions using pulse width modulation. To display at $\frac{1}{64}$th color intensity with a filter, such as a blue filter, the FLCD would be turned on for $\frac{1}{64}$th of the 300th to 600th of a second subfame that the blue filter is engaged. Although 6-bits per color, or a total of 18-bits for three colors, can effectively be displayed with a single currently available FLCD, 24-bit color cannot be reliably displayed. As a result, trade-offs must be made, either in frame rate, color separation, or color capability. Additional information about the technical difficulties involved in using FLCDs in field sequential color systems may be found in a technical disclosure entitled "FLC/VLSI Display Technology," dated Dec. 1, 1995, published by Displaytech, Inc., which is incorporated by reference herein in its entirety.

It is noteworthy that Texas Instruments has developed a so-called "one-color plus two-color" field sequential color system that uses digital or deformable micromirror devices (DMDs) capable of 24-bit color as imagers. The Texas Instruments system, however, uses two DMDs for addressing lamp spectrum issues, while not addressing imaging speed or bandwidth issues.

The present invention is directed to providing a full color, image producing system that uses available FLCDs, while avoiding some of the aforementioned design trade-offs.

SUMMARY OF THE INVENTION

In general, in one aspect, embodiments of the invention feature a system used in image projection. The system includes a first filter for receiving light, for directing a first portion of light to a first image source for first portion operation, and for passing a second portion of the light to a second image source for second portion operation. The system also includes an electronic color switch for alternately allowing components of the second portion to be passed to the second image source.

BRIEF DESCRIPTION OF THE DRAWINGS

Other objects and advantages of the invention will become apparent upon reading the following detailed description and upon reference to the drawings in which.

Figure 1:
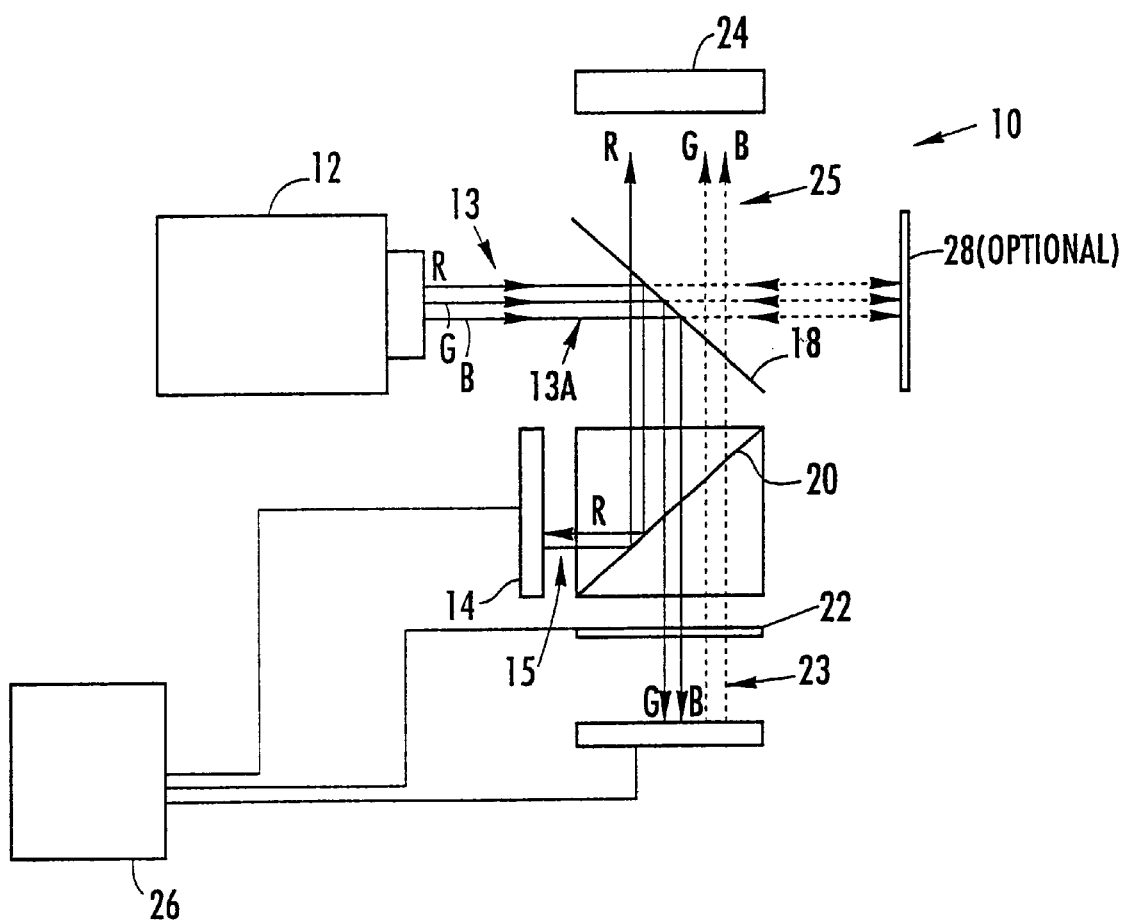
FIG. 1 is a plan view of components of a projection display system in accordance with an embodiment of the invention.

While the invention is susceptible to various modifications and alternative forms, exemplary embodiments thereof have been shown by way of example in the drawings and are herein described in detail. It should be understood, however, that the description herein of exemplary embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Referring now to the drawings, FIG. 1 illustrates a high resolution color image system 10 in accordance with an embodiment of the invention. The system 10 can be a reduced cost system. A light source 12 provides a portion of light 13 reflected by both a reflecting polarizer 18 and a one-color or color-selective filter 20 to a one-color imager or image source 14 (e.g., an LCD) as light 15. The light source 12 provides an additional portion of the light 13 reflected by the reflecting polarizer 18 and transmitted through both the one-color filter 20 and a color switch or color-operative filter 22 (e.g., an electro-optic color switch) to a two-color imager or image source 16 (e.g., an LCD) as light 23. The LCD 14 operates to provide one color, for example, one of the primary colors, for a colored image. The other LCD 16 operates to provide remaining colors, for example, the remaining two primary colors, for the colored image.

The light source 12 may be a highly efficient source of light, such as the light sources disclosed in U.S. patent application Ser. No. 08/747,190, now U.S. Pat. No. 5,833,360, filed Nov. 12, 1996, entitled "High Efficiency Lamp Apparatus for Producing a Beam Polarized Light," which is incorporated by reference herein in its entirety. The light source 12 may also be a high intensity discharge (HID) lamp, such as the lamps in U.S. Pat. No. 5,404,076, entitled "Lamp Including Sulfur," and U.S. Pat. No. 5,606,220, entitled "Visible Lamp Including Selenium or Sulfur," both issued to Dolan et al., and in PCT patent application No. PCT/US97/10490, International Publication No. WO97/45,858, entitled "Multiple Reflection Electrodeless Lamp With Sulfur or Selenium Fill and Method for Providing Radiation Using Such a Lamp," by MacLennan et al., which is also incorporated by reference herein in its entirety. The light source 12 may be a white light, "quasi"-white light, primary color light, or other three-color light source. Quasi-white light is produced when there is a deficiency in one or more color components relative to other components in the light. If the light source 12 has a weak spectral intensity in one portion of its color output spectrum, for example, in the red, choosing that weak portion of the color spectrum for imaging with the one-color LCD 14 can compensate for the weakness, as will be described below. Any one color, however, such as one of the primary colors, can be chosen to be the light 15 for the LCD 14. The light 23 for the LCD 16 can then be composed of the other two primary colors. For purposes of illustration and ease of description only, the color labels "R" for red, "G" for green, and "B" for blue are included in FIG. 1 for the incident and reflected light in the color image system 10. Moreover, the one-color LCD 14 and the two-color LCD 16 are described as the "red" LCD and the "green-blue" LCD, respectively.

The reflecting polarizer 18 may be constructed of a reflecting/polarizing material that does not substantially absorb light. The reflecting polarizer 18 is a reflecting linear polarizer as opposed to an absorptive linear polarizer. The reflecting polarizer 18 may be mounted in the optical path of the light source 12 and both the one- and two-color LCDs 14 and 16. The reflecting polarizer 18 has an intrinsic optical axis or direction of orientation that, when oriented appropriately, enables it to be used for separating polarization components in the incident light 13 by substantially reflecting only one polarization component of the light 13 while substantially transmitting its orthogonal polarization component. For example, "S"-polarized light may be reflected and "P"-polarized light transmitted. The reflecting polarizer 18, because it is substantially reflective and nonabsorptive, can handle high power light sources, such as the light source 12, without absorbing significant thermal energy.

In certain embodiments of the invention, a reflector, such as reflector 28 shown in FIG. 1, is also substantially nonaborptive, and, therefore, can handle high power light sources. The reflector 28 may be used when the light source 12 is capable of accepting back light of the polarization and/or colors that transmit through rather than reflect from the reflecting polarizer 18. This "unwanted" polarization (and/or colors) is reflected from the reflector 28 and transmitted again through the reflecting polarizer 18 back to the light source 12. Even in embodiments that include or do not include the reflector 28, it still may be possible for the unwanted polarization and/or colors of light to be reflected back to the light source 12 by the reflecting polarizer 18 after passing through other portions of the system 10, as will be appreciated by those skilled in the art. The light accepted back by the light source 12 may advantageously be used to "optically pump" light sources of certain types that could be used for the light source 12. Examples of such light sources are disclosed in the aforementioned U.S. patent application Ser. No. 08/747,190, now U.S. Pat. No. 5,833,360, and in prior, co-owned U.S. patent application Ser. No. 08/771,326, now U.S. Pat. No. 6,005,332 filed Dec. 20, 1996, entitled "Polarized Light Producing Lamp Apparatus That Uses Low Temperature Polarizing Film," which is incorporated by reference herein in its entirety.

The reflecting polarizer 18 may be constructed of any material that passes light of a desired linear polarization and reflects substantially all light of other polarizations, including unpolarized light. The reflector 28 may be similarly constructed. The reflecting polarizer 18 (and the reflector 28) may also be a relatively non-angle-specific reflecting polarizer. One such reflecting polarizer material is double brightness enhancement film (DBEF), a variety of multilayer optical film (MOF), which is commercially available from Minnesota Mining & Manufacturing Company. MOF can be used for the reflecting polarizer 18 and the reflector 28 and thereby avoid using an absorptive polarizer or material. Such nonabsorptive materials also afford an advantage in terms of thermal energy dissipation. For example, high power light of the polarization that is reflected back to the light source 12 by the reflector 28 (or the reflecting polarizer 18) will likely not heat up the system 10, which could otherwise exhibit detrimental thermal effects if that light were not reflected. Thus, an absorptive material or polarizer is not desirable, and the reflecting material or polarizer can replace such absorptive materials or polarizers to avoid or reduce these thermal effects. Nevertheless, an absorptive material could be used for the reflector 28 in certain other embodiments, but there would be no or little optical pumping due to any reflections from such an absorptive material.

As illustrated in FIG. 1, linearly polarized red, green, and blue (RGB) light 13 is reflected from the reflecting polarizer 18 toward the one- and two-color LCDs 14 and 16. The reflected light first reaches the one-color filter 20, which may be a dichroic filter or a dichroic mirror that reflects certain colors of light as the light 15, while allowing other colors to pass through as the light 23. The one-color filter 20 is located between the reflecting polarizer 18 and the one- and two-color LCDs 14 and 16. For purposes of illustration and ease of description only, it is assumed that the one-color filter 20 is a red filter and that the light 15 is a red light component of the RGB incident light 13, now polarized by the reflecting polarizer 18. The light 15 reflected by the one-color filter 20 is transmitted to the red LCD 14, while the two remaining components, for example, the green and blue light components, are permitted to pass through the one-color filter 20, and is transmitted to the green-blue LCD 16 as the light 23. In other embodiments, the one-color filter 20 could reflect the green or blue light components, or other components, and allow passage of remaining components.

For controlling the light 23 incident on the two-color LCD 16, a device, shown in FIG. 1 as the color switch 22, sequentially and alternately switches between the two remaining color components in the light 23. The color switch 22 may be a color filter (e.g., a two-color filter), switch, or light valve. The switch 22 can be electronically or mechanically controlled to alternately pass one primary color, and then the other primary color in the light 23, while reflecting back the color or colors not passed. The color switch 22 is located in the optical path of the two-color LCD 16, but outside the optical path of the one-color LCD 14. With this arrangement, the two-color LCD 16 imparts alternating color images on the light 23 that alternate between two colors, and the one-color LCD 14 imparts a one-color corresponding image on the light 15. Thus, the LCD 16 provides two color sequential components and the LCD 14 provides the remaining component for the displayed image to a display screen 24 as the light 25 (e.g., as might be useful in a field sequential color system, as will be appreciated by those skilled in the art). As can also be appreciated, any type of mechanical or electronic device capable of sequentially and alternately filtering out one of the two colors in the light 23 and passing the other color at switch (subframe) rates of approximately 200 to 400 Hz may be used for the color switch 22. This color switch rate is less than the approximate 300 to 600 Hz rate for a three-color/single imager system. Moreover, the intensities of the two colors may be lower than the intensity that would be required for them for the same integrated color brightness in the three-color/single imager system. This is because the two colors have a lower color switch rate (e.g., approximately $\frac{2}{3}$ the value), and can be used for imaging for a longer period of time (e.g., approximately $\frac{3}{2}$ times longer), leading to the lower intensities (e.g., approximately $\frac{2}{3}$ the values). The third (continuous) color component going to the one-color LCD 14 could remain at the same intensity needed for the same color brightness in the three-color/single imager system.

Further, in accordance with an embodiment of the invention, the one-color LCD 14 is chosen to be sufficiently fast for one-color continuous display and the two-color LCD 16 is chosen to be sufficiently fast for two-color sequential display. However, the system 10 is not sufficiently fast for three-color sequential display at color switch rates of 300 to 600 Hz. Color sequential filtering with the two-color LCD 16 and the switch 22, and continuous color filtering with the one-color LCD 14, enables the use of slower speed LCDs than would be required for a three-color/single LCD imager system using the three-color field sequential technique. Moreover, such an implementation may not be as expensive or bulky as a three imager system.

Referring again to FIG. 1, in operation, a controller or controller device 26 (e.g., a programmable controller) provides control voltage signals simultaneously to arrays of pixels (not shown), which are individually electrically addressable, in the red LCD 14 and the green-blue LCD 16. The controller 26 may be a video controller that can accept as input raw color or encoded video data for use in controlling the LCDs 14 and 16 for imaging. Each of these pixels in the LCDs 14 and 16 have different electrical states that either reflect the incoming light with little or no polarization shift or reflect polarization-shifted light (e.g., with an approximately 90° polarization change) to create colored image components. The LCDs on 14 and 16 thus reflect or transmit light that contains the same image, albeit different color components of that image, to the display 24 as the light 25. The light that is not polarization-shifted reflects off the reflecting polarizer 18 back toward the light source 12, and the pixels corresponding to this light appear dark in the image on the display 24. The pixels that reflect the polarization-shifted light, however, appear bright. The phase shift occurs because the LCDs 14 and 16 each comprise quarter-wave phase retarders in one of the states and the light 15 and 23 make double passes through each retarder. In the illustrated example, the red image imparted on the light 15 and reflected from the red LCD 14 is reflected by the one-color red filter 20 back through the reflecting polarizer 18 to the display screen 24. The alternating green and blue images imparted on the light 23 and reflected from the green-blue LCD 16 pass through the one-color red filter 20 and the reflecting polarizer 18 (except for the light not polarization-shifted) to the display screen 24. In this way, the red component and the green and blue components of the colored image are merged as the light 25 to form a full color image on the screen 24.

It can be shown how currently available FLCDs, having a bandwidth of approximately 100 KHz, may be used for the LCDs 14 and 16. First, consider a single imager being used for 8-bits per color (i.e., 8-bit color depth) operation. Assume that a 200 Hz frame rate is to be used instead of 100 Hz. This is a valid assumption because it has been found that a 200 Hz frame rate is a reasonable minimum, for example, in field sequential color systems, that may be used to substantially avoid the rainbow effects mentioned above. Therefore, a bandwidth of at least approximately 200 Hz (frames/sec)×3 (colors/frame)×256 (color values/color=color depth=8 bits/color)=153.6 KHz (color values/sec) would be required. This calculated value is greater than the 100 KHz bandwidth. Moreover, there may be dead time between colors. Thus, 8-bits per color (or 24-bit full three-color) operation may not be possible with a single FLCD imager, while also substantially avoiding the rainbow effects. Operation within the bandwidth limitations of FLCDs may, however, be possible using 6-bit color depth with the LCD 14 being a one-color imager and the LCD 16 being a two-color imager. The LCD 14 will have little problem operating within the 100 KHz bandwidth, because the one-color (e.g., red) may be continuously provided. On the other hand, for the LCD 16, if operation occurs using a color depth of 6 bits/color, then the bandwidth requirement would be approximately 200 Hz (frames/sec)×3 (colors/frame)×64 (color values/color=color depth=6 bits/color)= 38.4 KHz (color values/sec), a value well within the 100 KHz limit. A 180 Hz frame rate, which has been used in some systems, will also exceed the 100 KHz limit. Therefore, the present invention will allow a combined full three-color operation without the need to be driven beyond the capability of currently available FLCDs, albeit using a combination of the one-color and the two-color imagers. In other words, the response times of both imagers or LCDs 14 and 16 (i.e., in the present invention) are too slow for 8-bit color depth, three-color operation, but not too slow for 6-bit color depth, three-color operation.

Referring again to FIG. 1, the controller 26 supplies control voltage signals to the color switch 22, as generally indicated by the coupling of the controller 26 and the color switch. The type of control signal that is sent depends on the specific implementation of the color switch 22, as will be appreciated by those skilled in the art. In certain embodiments, the color switch 22 may be a rotating filter, in which case, the control signals supplied by the controller 26 will be signals that control the rotation of a motor drive (not shown) for the color switch 22. On the other hand, in certain other embodiments, the color switch 22 may be an LCD-based device. In this case, the control signals supplied by the controller 26 to the color switch 22 will be signals that control states of the color switch 22 that pass or filter particular color components of the light 23, as will be described below. Alternatively, a different controller (not shown) could be used to send control voltage signals to the color switch 22, rather than the controller 26.

Figure 2:
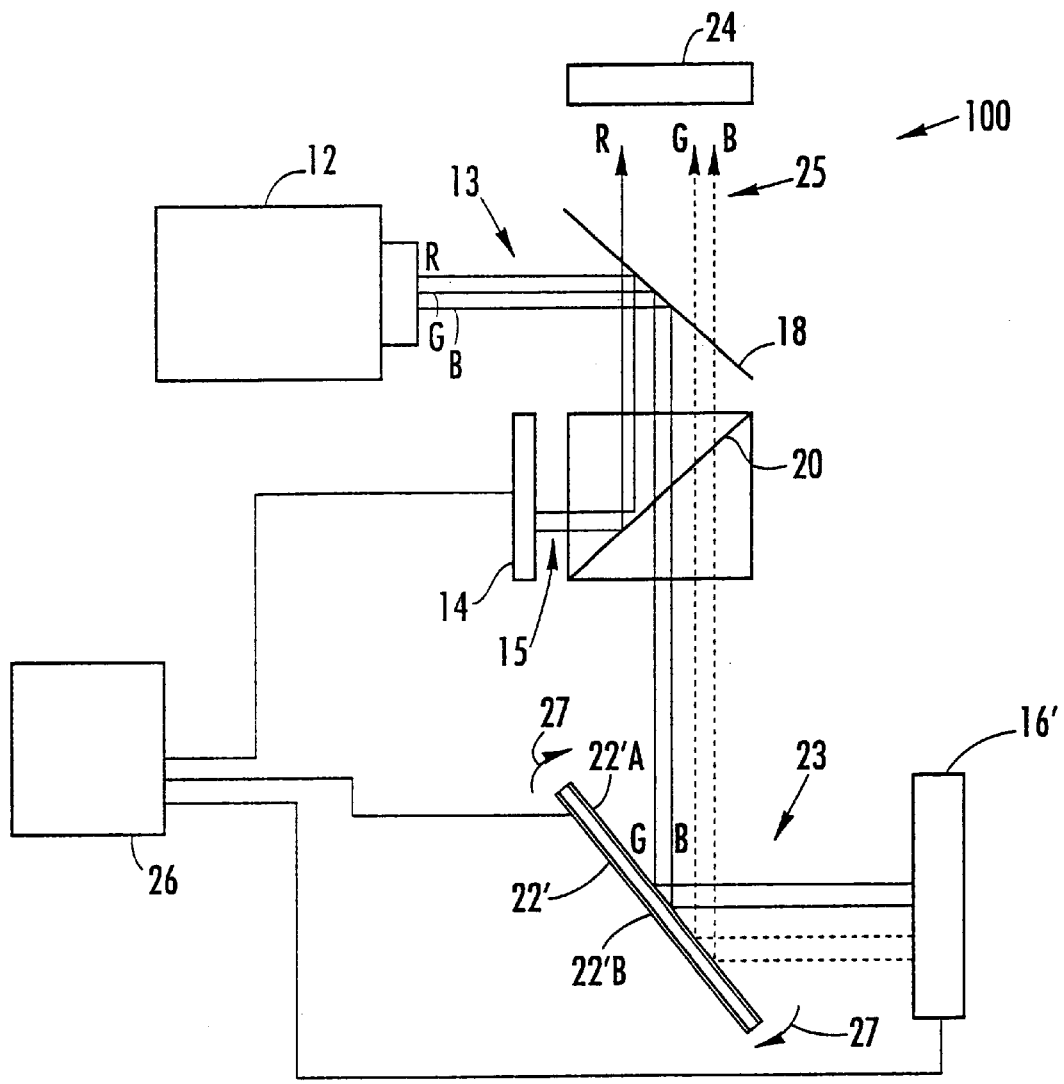
FIG. 2 shows an implementation of components of the projection display system in FIG. 1 in accordance with an embodiment of the invention.

FIG. 2 illustrates a high resolution color image system 100 in accordance with an exemplary embodiment of the invention. In the system 100, the color switch 22 in FIG. 1 may be implemented as a color switch 22' for two-color operation, and include two different dichroic filters or dichroic mirrors 22'A and 22'B, one for each color. In certain other embodiments, the color switch 22' can be implemented as a multifaceted reflector, such as a polygonal reflector, with each consecutive reflective surface alternating between filters like the filter 22'A and filters like the filter 22'B. A multifaceted reflector may be advantageous in that the rotational rate for driving the reflector, for example, by a motor drive, can be reduced while still providing a rapid alternation between the filters, depending, among other things, on the number of facets.

In the embodiment shown in FIG. 2, the dichroic filters 22'A and 22'B are mounted separately for rotation (generally indicated by arrows 27) about an axis perpendicular to the direction of the incident light (i.e., an axis generally perpendicular to the drawing page in FIG. 2) and may be rotationally driven by a motor (not shown) via suitable coupling. The controller 26, in this embodiment, provides control voltage signals to the drive motor, as discussed above. Moreover, the reflector 28, as described above, may be used in the system 100. Each dichroic filter 22A' and 22B' is oriented by periodic rotation about this axis for receiving the green and blue light 23, and only passes them sequentially and alternately in a spectral sweep across a green-blue LCD 16' (e.g., the same type of LCD or imager as the LCD 16). The light 23 has sequential green and blue images imparted thereon and is reflected from the LCD 16' back to the color switch 22' to be transmitted as the light 25 to the display 24. The alternating presentation of the filters 22'A and 22'B to the green and blue light 23 represents effective rotational "states" of the color switch 22', one for each of the two colors.

Examples of other suitable color filters, switches, or light valves that may be used for the color switch 22 include the systems disclosed in concurrently filed, co-owned U.S. patent application Ser. No. 09/238,713, filed Jan. 28, 1999, now U.S. Pat. No. 6,490,017. Austin Huang and Richard M. Knox, entitled "Separating White Light Into Polarized, Colored Light," which is incorporated by reference herein in its entirety. Such systems employ an electro-optic shutter or filter, and will be described below in greater detail. The electro-optic shutter has states or modes and can switch between them in response to control voltage signals received from a controller, as discussed above. In one state, the electro-optic shutter substantially passes a set of colors of light, for example, two colors such as red and green. In another state, the electro-optic shutter substantially passes another set of colors that includes one color common to the original set and another color not common to those in the original set, such as red and blue. Thus, each state passes substantially at least one (e.g., primary) color that is not passed by the other state. In either of the different states, the electro-optic shutter substantially excludes from passage one or more different colors that are not common to the different states.

Figure 3:
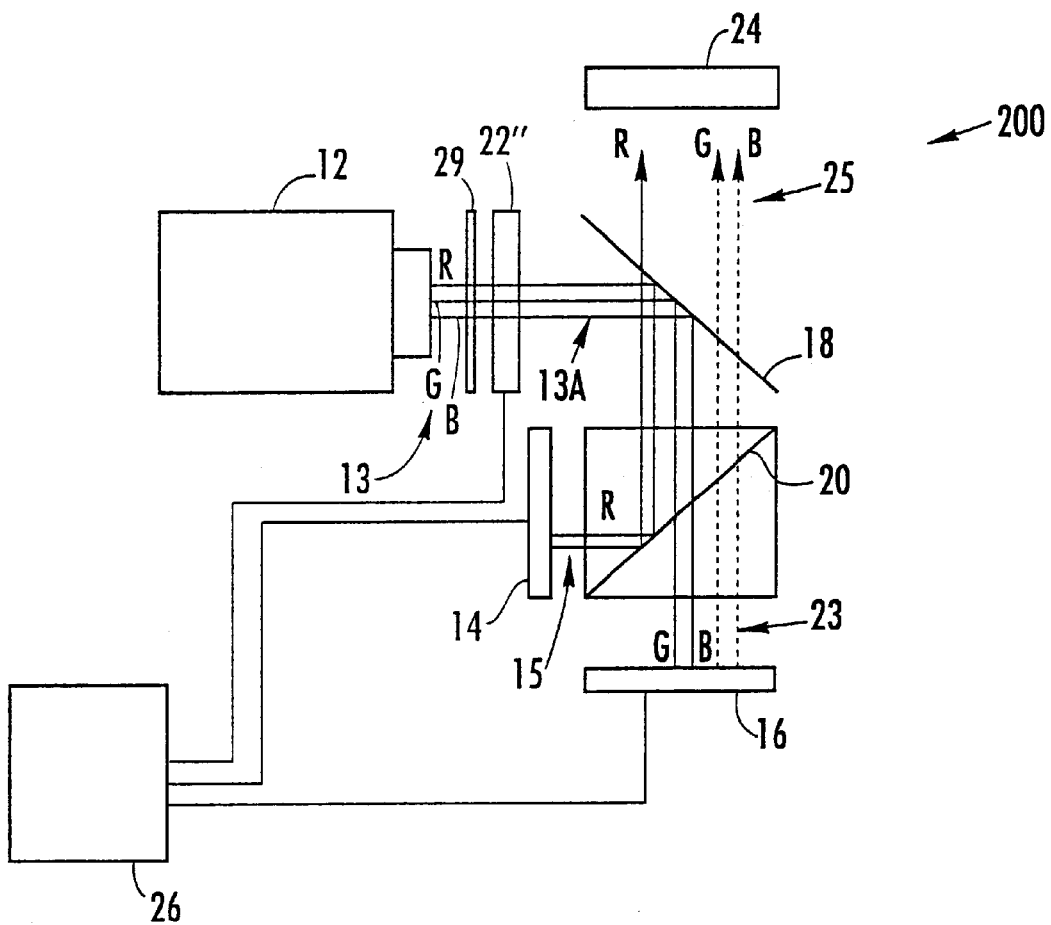
FIG. 3 is a plan view of components of a projection display system in accordance with an embodiment of the invention.

To illustrate how an electro-optic shutter, such as that described above, may be advantageously employed as a color switch for performing the same function as the color switch 22 in the system 10 in FIG. 1, reference is made to FIG. 3. In FIG. 3, in a high resolution color image system 200, in accordance with an embodiment of the invention, an electro-optic color switch (e.g., shutter 22"), is used instead of the color switch 22. The shutter 22" is located between the light source 12 and the reflecting polarizer 18. In certain embodiments, the shutter 22" is mounted at an end of a tapered light pipe (TLP), a type of light guide employing total internal reflection (TIR). The other end of the TLP would be positioned at or near the output of the light source 12 to couple light into the TLP.

The shutter 22" may be operated so that two color (e.g., green and blue) components alternately pass through the shutter 22", while always passing a third (e.g., red) component of the input light 13 (e.g., as might be useful in a field sequential color system, as will be appreciated by those skilled in the art). The shutter 22" switches between its (e.g., two) states or modes under control of the controller 26 and is adapted to support a refresh rate of at least 60 Hz. Alternatively, a separate controller (not shown) could be used. In certain embodiments, a linear polarizer 29, positioned between the light source 12 and the shutter 22", is used to polarize the light 13, as will be described below in more detail. Use of the linear polarizer 29 could allow the reflecting polarizer 18 to be a mirror instead of a reflecting polarizer. If the reflecting polarizer 18 were not a mirror, an intrinsic optical axis of the polarizer 29 would have to be appropriately aligned with the intrinsic optical axis of the reflecting polarizer 18 for operation of the system 10 (or other similar systems disclosed herein). The linear polarizer 29 is included unless the light source 12 itself produces linearly polarized light for the light 13 or linear polarized light is produced by another means. Such other means could be a polarizing (e.g., MOF) reflector situated between the light source 12 and the color switch 22" that allows a preferred polarization to pass while reflecting a non-preferred polarization back to the light source 12. This reflecting polarizer could replace the optional reflector 28 as a way to avoid first surface reflection effects toward the display 24 if light reflected back from the reflector 28 exhibited such effects.

The shutter 22" alternates passage of green and blue components of the light 13 by temporally switching their transmission, so that in a first time period, substantially all the red and green wavelengths in the incident portion of light 13 are transmitted to an outgoing portion of the light 13A that is reflected by the reflecting polarizer 18 and split by the one-color filter 20 into the light 15 and 23, as before. During the first time period, shown schematically in FIG. 4, the shutter 22" does not substantially transmit the blue component light in the incident portion of the light 13. In a second time period, the shutter 22" has switched and transmits substantially all the red and blue wavelengths in the incident portion of the light 13 to the outgoing portion of the light 13A. During the second time period, the shutter 22" does not substantially transmit the green wavelengths in the incident light 13 to the outgoing portion of the light 13A.

The electro-optic shutter 22" may be adapted to temporally switch the two component (e.g., green and blue) colors of the light 13 to approximately equalize, increase, or decrease their time average intensities relative to the third nonswitched (e.g., red) color in the light 13. This may be desirable, if, for example, the light source 12 is color-deficient in the third color component. In other words, the third color component has an average intensity, as output from the light source 12, that is less than the average intensities of the other two color components, as discussed in the aforementioned concurrently filed U.S. patent application Ser. No. 09/238,713; now U.S. Pat. No. 6,490,017. This may be understood by referring to FIG. 4, which illustrates the color switching action of the electro-optic shutter 22". By adjusting the length of first and second time periods that the green and blue light components of the light 13 pass through the shutter 22", for example, using the controller 26, their average intensities may be adjusted relative to the intensity of the red component. This may be accomplished by time or pulse width modulation of the shutter 22", and is possible because the red light component of the light 13 is arranged to be continuously available, as shown in FIG. 4.

Figure 4:
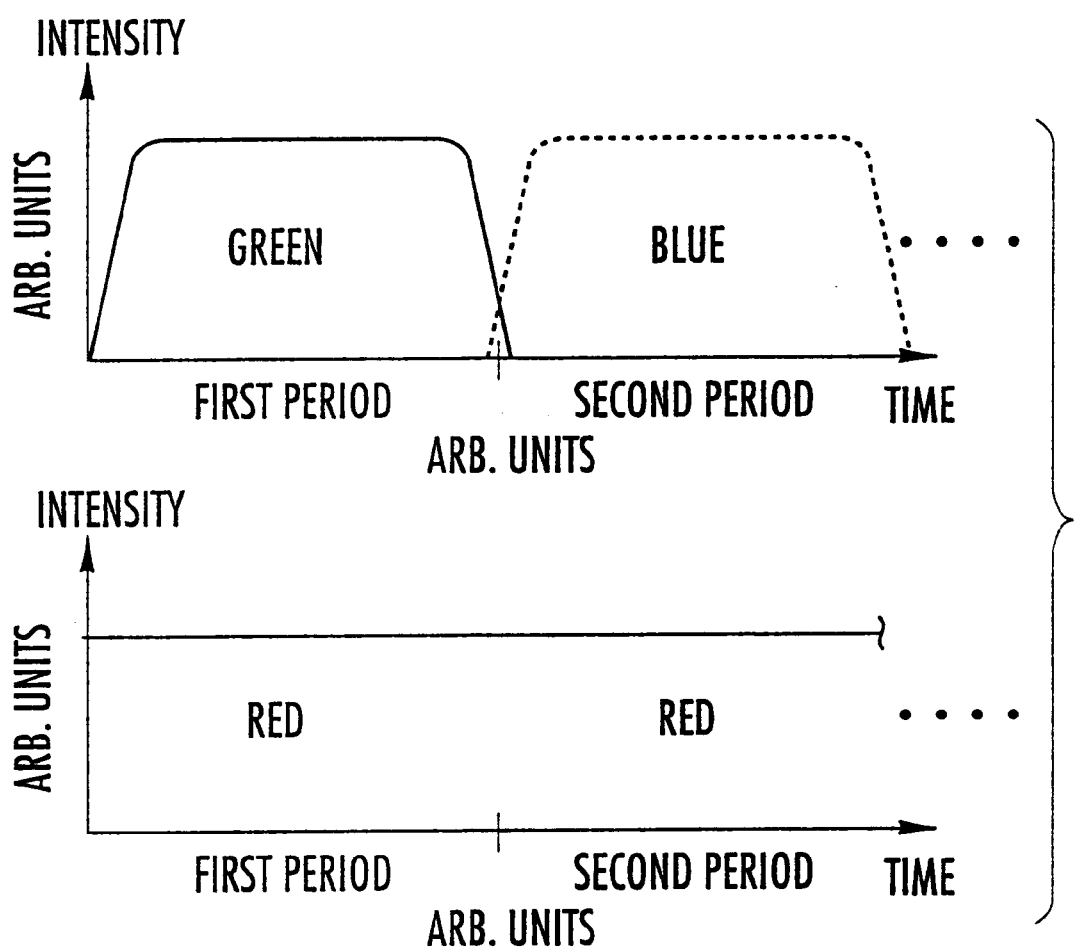
FIG. 4 is a graph illustrating color-selectivity of a component in FIG. 3.

The length of the switched first and second time periods in FIG. 4 are limited, to a certain extent, by the switching frequencies obtainable with the electro-optic shutter 22". In embodiments of the electro-optic shutter 22" that employ FLCs or nematic liquid crystals, the maximum switching frequencies are about 100 KHz (as discussed above) and about 100 MHz, respectively. The present invention is intended to include embodiments of the shutter 22" that employ any optically active liquid crystal.

Referring to FIGS. 5A–5D, an implementation of the shutter 22" in different states is illustrated as an electro-optic shutter 30 in accordance with another exemplary embodiment of the invention. From the incident portion of the light 13 from the light source 12 (shown as red, green, and blue for illustrative purposes in FIGS. 5A–5D), the electro-optic shutter 30 produces the outgoing light 13A. The incoming light 13 passes through the linear polarizer 29 (not shown in FIGS. 5A–5D) that is positioned between the light source 12 and the shutter 30. Therefore, the light 13 is assumed to already be linearly polarized, as illustrated by arrows in FIGS. 5A–5D. The linearly polarized light 13 enters the electro-optic shutter 30, which includes liquid crystal layers 94, 96 and first and second color-selective polarizes 86, 88. The light 13 passes through the liquid crystal layer 94, then through the first and second color-selective polarizers 86, 88, and finally through the liquid crystal layer 96. The light 13 is subsequently output as the colored and polarized light 13A.

The electro-optic shutter 30 may be constructed as a sandwich-type structure (not shown in detail in FIGS. 5A–5D) containing the liquid crystal layers 94, 96, as discussed in the aforementioned concurrently filed U.S. patent application Ser. No. 09/238,713, now U.S. Pat. No. 6,490,017. In some embodiments, the liquid crystal layers 94, 96 are constructed with liquid crystals selected from the group consisting of ferroelectric liquid crystals and twisted nematic liquid crystals. Transparent electrodes (e.g., constructed of indium tin oxide or ITO) may be applied on both sides of glass plates (not shown) that surround each of the liquid crystal layers 94, 96 to facilitate application of voltages across the liquid crystal layers 94, 96. The glass plates provide structural rigidity to the shutter 30, and pairs of the transparent electrodes are layered on each pair of these glass plates in order to provide an electric field across the liquid crystal layers 94, 96 for changing their optical properties under control of the controller 26. Additional polymer layers may also be applied between the electrode layers and the sides of the liquid crystal layers 94, 96 toward which they face. The additional polymer layers may be constructed of polyimide.

The shutter 30 may be electrically operated by the controller 26 (FIG. 3), as discussed above, to switch or toggle the colors in the outgoing light 13A by applying the voltages from a source (not shown) across one or both of the liquid crystal layers 94, 96. The controller 26 may apply a voltage to one, both or neither of the liquid crystal layers 94, 96 at any particular time during operation of the shutter 30. Electrical operation in this manner changes the optical properties of the shutter 30 by either applying or not applying these voltages.

The two liquid crystal layers 94, 96 and the color-selective polarizers 86, 88 are optical devices that can exhibit birefringence. The layers 94, 96 have two voltage-controlled states: a "FIRST" or "OFF" state and a "SECOND" or "ON" state. In the SECOND state, each of the liquid crystal layers 94, 96 is birefringent and behaves approximately as a ½-wave phase retarder, i.e., a layer that rotates the polarization of incoming light of a selected wavelength or color range by approximately 90°. Because the incoming light 13 contains several selected wavelengths or color ranges, e.g., red, green, and blue wavelength ranges, the first and second liquid crystal layers 94, 96 only approximately rotate the polarization of each of the selected wavelength ranges by 90° when in the SECOND state. The precise rotation has a small wavelength dependence. In the FIRST state, the liquid crystal layers 94, 96 are not birefringent, i.e., in the FIRST state, the liquid crystal layers 94, 96 do not (or minimally) rotate the polarization of the incoming light 13.

The first and second color-selective polarizers 86, 88 may be constructed of cholesteric liquid crystal, polycarbonate, or any other suitable reusable type of retarder material available from Colorlink, Inc. and other manufacturers. The polarizers 86, 88 may be similar to passive devices described in U.S. Pat. No. 4,425,028, issued to Gagnon and Carson, entitled "High Efficiency Optical Tank For Three Color Liquid Crystal Light Valve Image Projection With Color Selective Prepolarization And Single Projection Lens" and U.S. Pat. No. 4,544,237, issued to Gagnon, entitled "High Efficiency Optical Tank For Two-Color Liquid Light Valve Image Projection With Color Selective Prepolarization." The polarizers 86, 88 may also be similar to passive devices described in PCT application No. PCT/US96/07527, International Publication No. WO 96/37806, filed May 23, 1996, by Gary D. Sharp, entitled "Color Polarizers," published Nov. 28, 1996. U.S. Pat. Nos. 4,425,028 and 4,544,237, and published PCT application No. PCT/US96/07527 are incorporated by reference herein in their entirety.

The first and second color-selective polarizers 86, 88 transmit selected colors and polarizations of light. The first color-selective polarizer 86 transmits both polarizations of light in the red and green wavelength range and transmits blue light that is polarized perpendicularly to the polarizing direction of the polarizer 29, which is generally in a direction perpendicular to the drawing sheet in FIG. 3. An internal optical direction of the first color-selective polarizer 86 is aligned with the polarization direction of the polarizer 29 to correlate the polarization selectivity of both devices. Similarly, the second color-selected polarizer 88 transmits both polarizations of light in the red and blue wavelength ranges. The color-selective polarizer 88 transmits the light in the green wavelength range that is polarized parallel to the polarizing direction of the polarizer 29. An internal optical direction of the second color-selective polarizer 88 is aligned with the polarizing direction of the polarizer 29 to correlate the polarization selectivity of both devices. The color-selective polarizers 86, 88 reflect substantially all visible light of polarizations in wavelength ranges that are not transmitted.

Figure 5A:
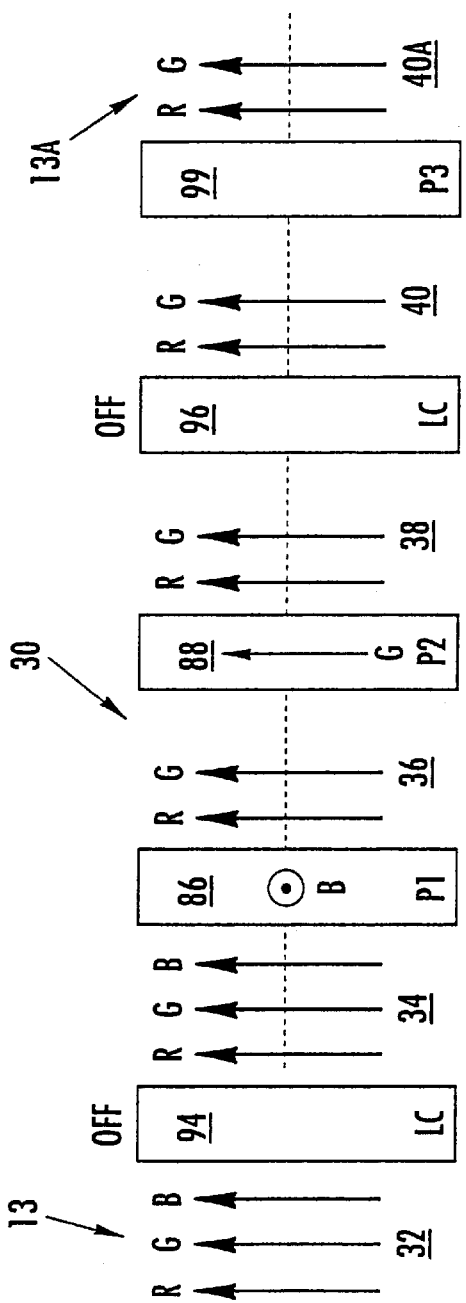
FIGS. 5A–5D show views and states of an exemplary implementation of the components in FIG. 3 in accordance with another exemplary embodiment of the invention.

FIG. 5A illustrates the electro-optic shutter 30 when the liquid crystal layers 94, 96 are both in the FIRST state, i.e., no voltage is applied. In an input region 32 the polarized red, green, and blue light 13 enters the shutter 30 as polarized by the polarizer 29 shown in FIG. 3. Because the first liquid crystal layer 94 is in the FIRST state, the light 13 from the region 32 is transmitted to a second region 34 without (or with minimal) polarization rotation. The first color-selective polarizer 86 substantially transmits only red and green light having the initial polarization of the light 13 in the input region 32, and a third region 36 substantially receives only red and green light having the initial polarization. The blue light in the initial polarization state is substantially not transmitted by the color-selective polarizer 86. Because the second color-selective polarizer 88 substantially transmits all colors of light having the initial polarization, a fourth region 38 substantially receives only red and green light having the initial polarization. The second liquid crystal layer 96, being in the FIRST state, does not substantially rotate (or minimally rotates) light polarization, and an output region 40 substantially receives the available red and green light, having the initial polarization of the light 13 in the input region 32, as the output light 13A.

Figure 5B:
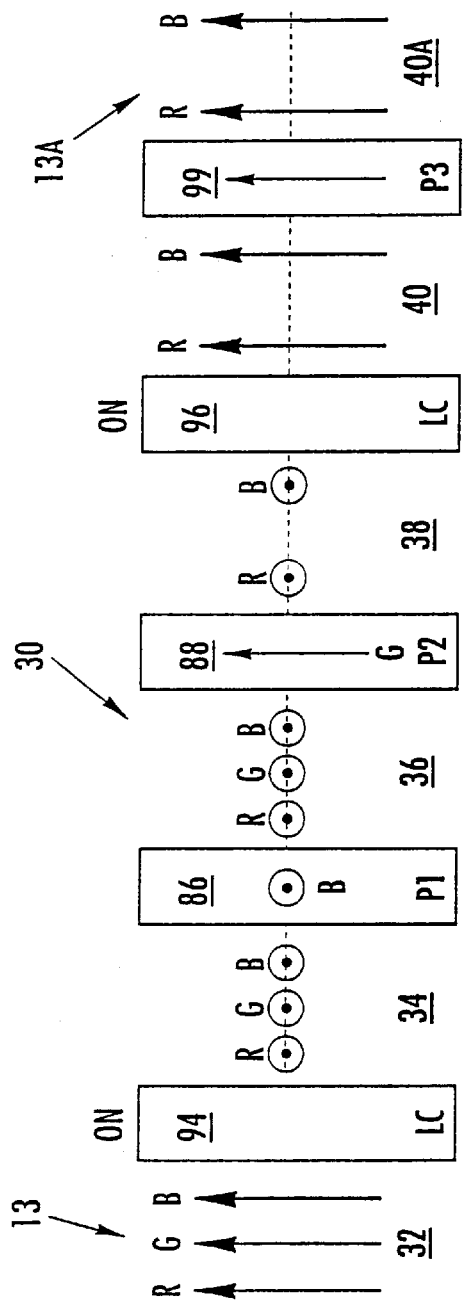

FIG. 5B illustrates the electro-optic shutter 30 when the liquid crystal layers 94, 96 are both in the SECOND state. In the input region 32, the linearly polarized incident red, green, and blue light 13 enters the shutter 30. Because the first liquid crystal layer 94 is in the SECOND state, the polarization of all light entering into the second region 34 is rotated. The second region 34 substantially receives the red, green, and blue light with polarization rotated by about 90°, i.e. orthogonal to the incident polarization. The first color-selective polarizer 86 transmits substantially all the input light with a polarization rotated by about 90°. Therefore, all three red, green, and blue colors enter the third region 36 with substantially the 90° rotated polarization. The second color-selective polarizer 88 substantially only transmits red or blue light, having the approximately 90° rotated polarization, into the fourth region 38. Because the second liquid crystal layer 96 is in the SECOND state, the second liquid crystal layer 96 rotates the polarization of light incident thereon by approximately 90°. Then, the output region 40 substantially receives the red and blue light in the initial polarization state of the light 13 in the input region 32.

Figure 5C:
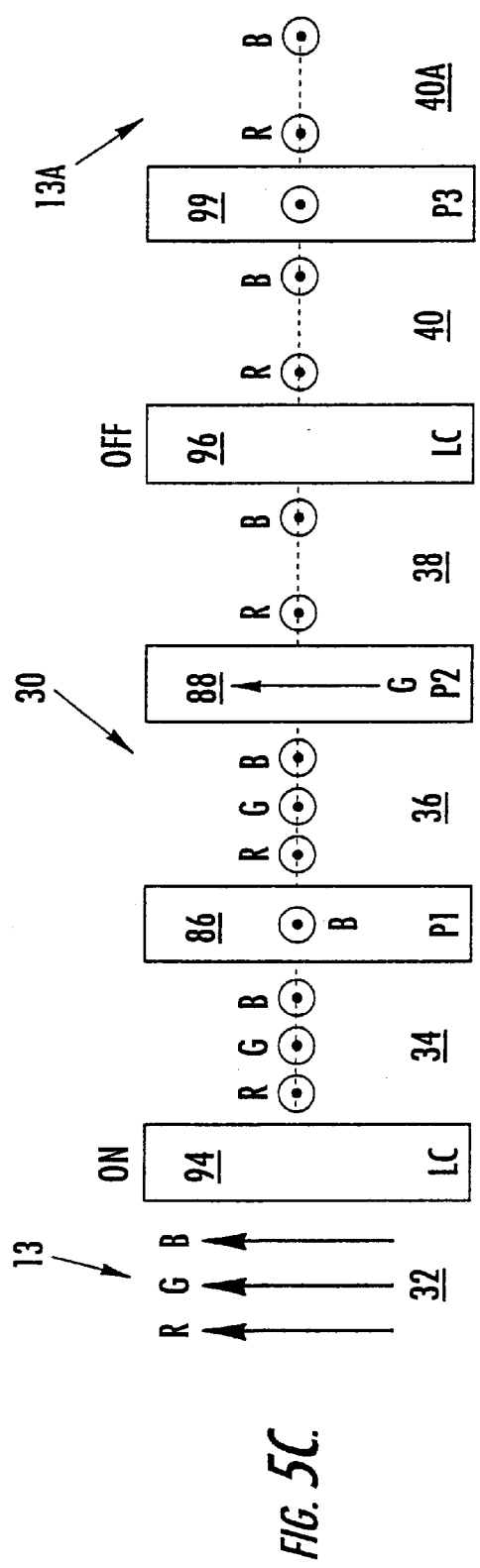

FIG. 5C illustrates the electro-optic shutter 30 when the liquid crystal layer 94 is in the SECOND state and the second liquid crystal layer 96 is in the FIRST state. Linearly polarized red, green and blue light 13 enters in the input region 32. Because the first liquid crystal layer 94 is in the SECOND state, the polarization of substantially all the light incident thereon is rotated. Thus, the second region 34 substantially receives light of all three colors with the polarization rotated by about 90°. The first color-selective polarizer 86 transmits substantially all light having the rotated polarization. Thus, the third region 36 substantially receives light of red, green, and blue colors polarized substantially orthogonal to the polarization of the light in the input region 32. The second color-selective polarizer 88 transmits substantially all red and blue light with the rotated polarization and reflects substantially all green light having the rotated polarization. Thus, the fourth region 38 substantially receives the red and blue light with the substantially rotated or orthogonal polarization. Because the second liquid crystal layer 96 is in the FIRST state, it does not substantially rotate the polarization of light incident thereon. Therefore, the output region 40 substantially receives red and blue light having a polarization rotated by approximately 90° with respect to the initial polarization of the light 13 in the input region 32.

Figure 5D:
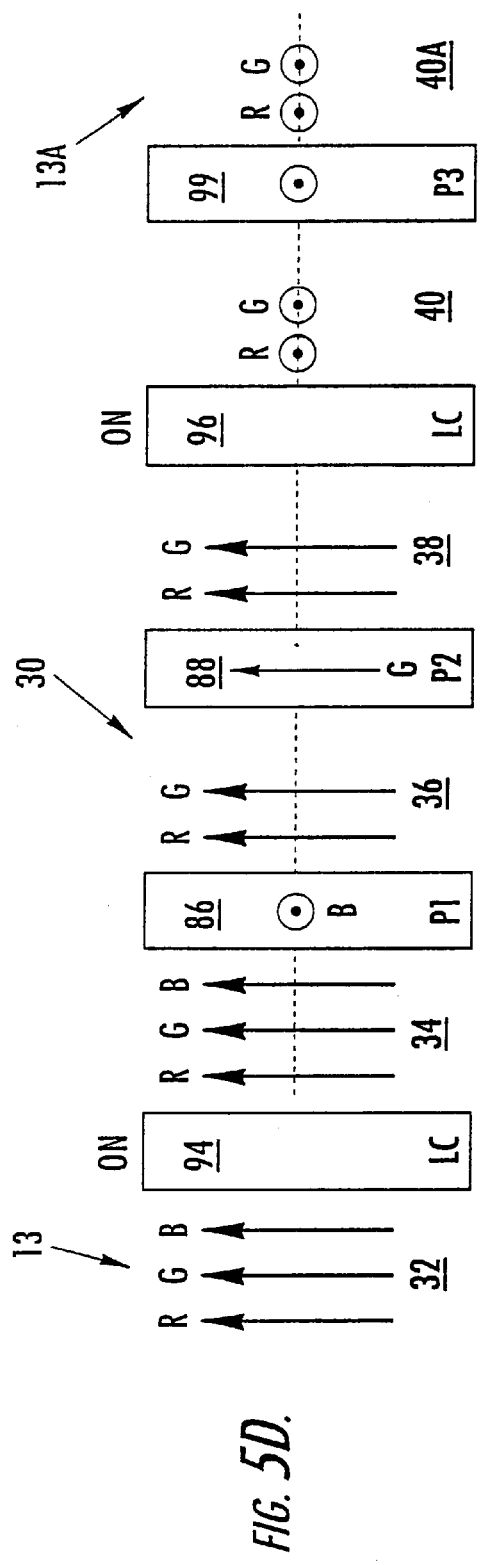

FIG. 5D illustrates the electro-optic shutter 30 when the first liquid crystal layer 94 is in the FIRST state and the second liquid crystal layer 96 is in the SECOND state. Because the first liquid crystal layer 94 is in the FIRST state, light is substantially transmitted by the first liquid crystal layer 94 from the input region 32 without substantial polarization rotation. The second region 34 substantially receives red, green, and blue light that has the initial polarization of light 13 from the left region 32. The first color-selective polarizer 86 substantially transmits all the red and green light with the initial polarization and reflects substantially all the blue light with the initial polarization. The third region 36 substantially receives the red and green light with the initial polarization. The second color-selective polarizer 88 substantially transmits all the red and green light with the initial polarization to the fourth region 38. Because the second liquid crystal layer 96 is in the SECOND state, it substantially rotates the polarization of light incident thereon by about 90°. Thus, the output region 40 substantially receives the red and green light having a polarization substantially orthogonal to the initial polarization of the light 13 in the input region 32.

Figure 6A:
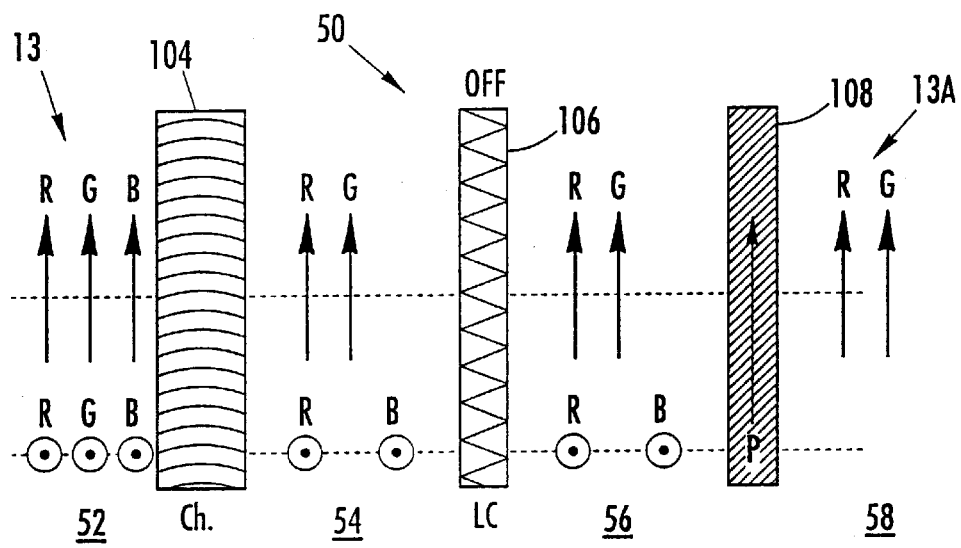
FIGS. 6A and 6B show views and states of an implementation of the component in FIG. 3 in accordance with another exemplary embodiment of the invention.
Figure 6B:
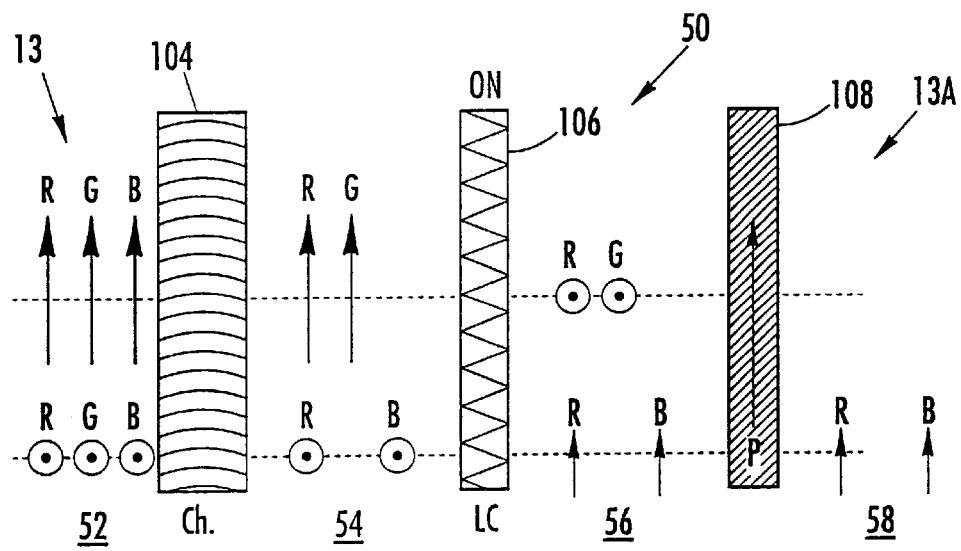

FIGS. 6A–6B illustrate another implementation of the electro-optic shutter 22" shown in FIG. 3 as an electro-optic shutter 50 in accordance with another exemplary embodiment of the invention. This embodiment, when implemented as in FIG. 3, does not require the linear polarizer 29, as discussed above. The electro-optic shutter 50 includes a color-selective layer 104, a liquid crystal layer 106, and a linear polarizer 108. The electro-optic shutter 50 may be constructed using glass plates, transparent electrodes, etc., as similarly described above for the electro-optic shutter 30, and as disclosed in the aforementioned concurrently filed U.S. patent application Ser. No. 09/238,713, U.S. Pat. No. 6,490,017. The controller 26 or another controller may be used to control the states of the electro-optic shutter 50 (i.e., states of the liquid crystal layer 106), as similarly discussed above. In FIG. 6A, the liquid crystal layer 106 is shown when it is in a FIRST or OFF state (similar to the FIRST state described above). In an input region 52, the incoming unpolarized light 13 of red, green, and blue colors enters the shutter 50. The color-selective layer 104 substantially transmits both polarizations of the red light, a first polarization of the green light, and a substantially orthogonal polarization of the blue light to a second region 54. The manufacture of the color-selective layer 104 from, for example, cholesteric liquid crystal layers is known in the art. The polarization of green light transmitted by the layer 104, e.g., a cholesteric layer, is parallel to an intrinsic optical axis of the layer 104.

Cholesteric layers with preselected wavelength ranges can be obtained from Rolic Ltd., Postfach 3255, Basel Switzerland CH-4002 and from other manufacturers. Materials used to construct the color-selective layer 104 are also available from Colorlink, Inc. The material used to construct the color-selective layer may be similar to materials used to construct the color-selective polarizers 86, 88. Moreover, the color-selective layer may be similar to devices described in the aforementioned U.S. Pat. Nos. 4,425,028 and 4,544,237, and in published PCT application No. PCT/US96/07527.

In FIG. 6A, because the liquid crystal layer 106 is in the FIRST state, it substantially transmits the light from the second region 54 to a third region 56 without a substantial polarization rotation. The polarizer 108 substantially transmits to an output region 58, the red light of polarization parallel to an intrinsic optical axis of the polarizer 108 and the green light of the first polarization discussed above as the output light 13A. Appropriate alignment of the intrinsic optical axis of the polarizer 108 with that of the reflecting polarizer 18 will allow the red and green light 13A to be reflected from the reflecting polarizer 18 for operation of the system 200.

FIG. 6B illustrates the electro-optic shutter 50 when the liquid crystal layer 106 is in a SECOND or ON state (similar to the SECOND state described above). Again, the color-selective layer 104 substantially transmits both polarizations of red light, the first polarization of green light, and a substantially orthogonal polarization of blue light in the light 13 from the first region 52 to the second region 54. Because the liquid crystal layer 106 is in the SECOND state, it substantially rotates the polarization of light substantially transmitted from the second region 54 to the third region 56 by about 90°. The third region 56 substantially receives the red light of both polarizations, the green light of the orthogonal polarization, and the blue light of the first polarization. Again, the polarizer 108 substantially only transmits polarizations substantially parallel to its intrinsic optical axis to the output region 58 as the light 13A. Therefore, the red and blue light are substantially transmitted to the output region 58 in response to the electro-optic shutter 50 being in the SECOND state. Again, appropriate alignment of the intrinsic optical axis of the polarizer 108 with that of the reflecting polarizer 18 will allow the light 13A, now red and blue, to be reflected from the reflecting polarizer 18 for operation of the system 200.

In the FIRST state, the electro-optic shutter 50, as shown in FIG. 6A, substantially transmits red and green light, while in the SECOND state, the shutter 50, as shown in FIG. 6B, substantially transmits red and blue light. In both states, the incoming white or quasi-white light beam 13 is unpolarized and the outgoing light beam 13A has a linear polarization that does not depend on whether the shutter 50 is in the SECOND or the FIRST state. However, in various embodiments, the electro-optic shutter 50 is designed to produce different colors in the outgoing light 13A in response to being in the SECOND and FIRST states.

Thus, as will be appreciated by those of skill in the art, the switch 22" may be constructed using either of the electro-optic shutters 30 or 50 shown in FIGS. 5A–5D and 6A–6B, respectively, to provide, for example, continuous one-color (e.g., red) and sequential and alternate two-color (e.g., green and blue) light as output.

Further information on electro-optic devices, modulators, color-selective layers, and filters employing liquid crystal devices or displays, and their effects on light color and light polarization may be found in U.S. Pat. No. 5,686,931, entitled "Device for Displaying Colors Produced By Controllable Cholesteric Color Filters," issued to Fünfschilling et al. and in International Application Published Under The Patent Cooperation Treaty (PCT) No. PCT/US97/08290, filed May 14, 1997, by Kristina M. Johnson and Gary D. Sharp, entitled "Color Selective Light Modulators," International Publication No. 97/43862, published Nov. 20, 1997. U.S. Pat. No. 5,686,931 and PCT application No. PCT/US97/08290 are incorporated by reference herein in their entirety.

The present invention is also related to projection display systems. Information on projection display systems, and the use of polarization in such systems, can be found in prior, co-owned U.S. patent application Ser. No. 08/581,108, filed Dec. 29, 1995, entitled "Projecting Images" and the aforementioned U.S. patent application Ser. No. 08/747,190, now U.S. Pat. No. 5,833,360, and in European Pat. application No. 96309443.8, EPO 783133A1, filed Dec. 23, 1996, also entitled "Projecting Images," published Jul. 9, 1997. The contents of U.S. patent application Ser. No. 08/581,108 and the published European Pat. application No. 96309443.8, EPO 783133A1 are incorporated by reference herein in their entirety.

Figure 7:
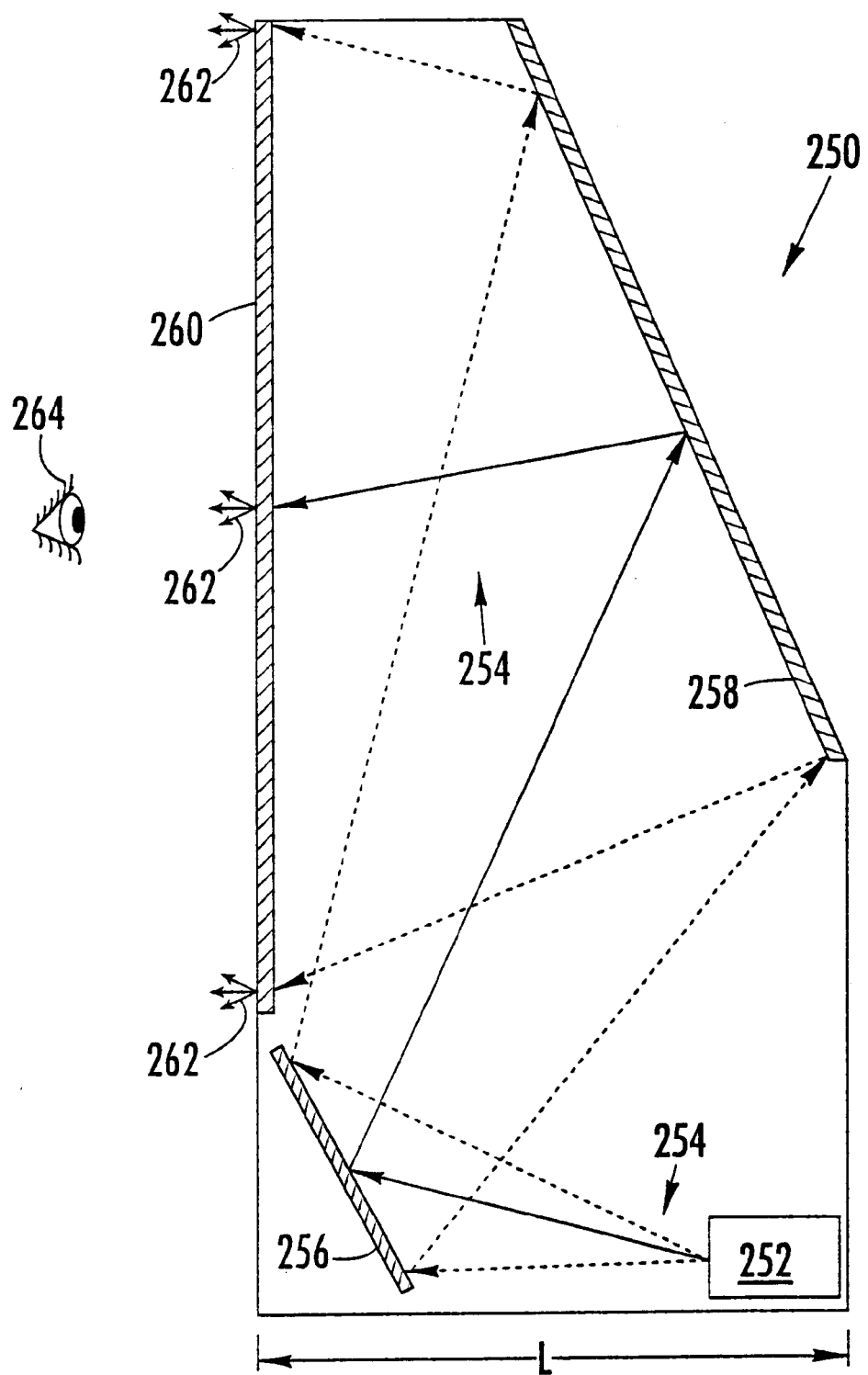
FIGS. 7 and 8 are side views of display systems in accordance with embodiments of the invention.

FIG. 7 illustrates a rear projection system 250 similar to the systems described in the aforementioned U.S. patent application Ser. Nos. 08/581,108 and 08/747,190, and European Pat. application No. 96309443.8, EPO 783133A1. The rear projection system 250 can advantageously employ the high resolution color image systems 10, 100, or 200 in accordance with embodiments of the invention. The system 250 may be used as part of or in a computer monitor or television display.

The display apparatus 200 includes an imager or image source 252 (e.g., in the systems 10, 100, or 200 that produces the light 25). The image source 252 may be included in image engines similar to those described in U.S. patent application Ser. No. 08/730,818, now U.S. Pat. No. 6,390,626 filed Oct. 17, 1996, entitled "Image Projection System Engine Assembly," which is incorporated by reference herein its entirety. The image source 252 outputs image light 254 (e.g., the light 25) in response to input signals, for example, electronic, video, or other signals received from an antenna, cable, computer, or controller (e.g., from the controller 26 or another source). The image light 254 reflects off a lower mirror or reflector 256 to a higher mirror or reflector 258. The light 254 is then reflected by the upper mirror or reflector 258 and is directed to a screen 260. The screen 260 may be a diffusive screen or diffuser. The screen 260 scatters the image light 254 as light 262, which a viewer 264 can see as forming an image at the screen 260 of the display system 250.

Figure 8:
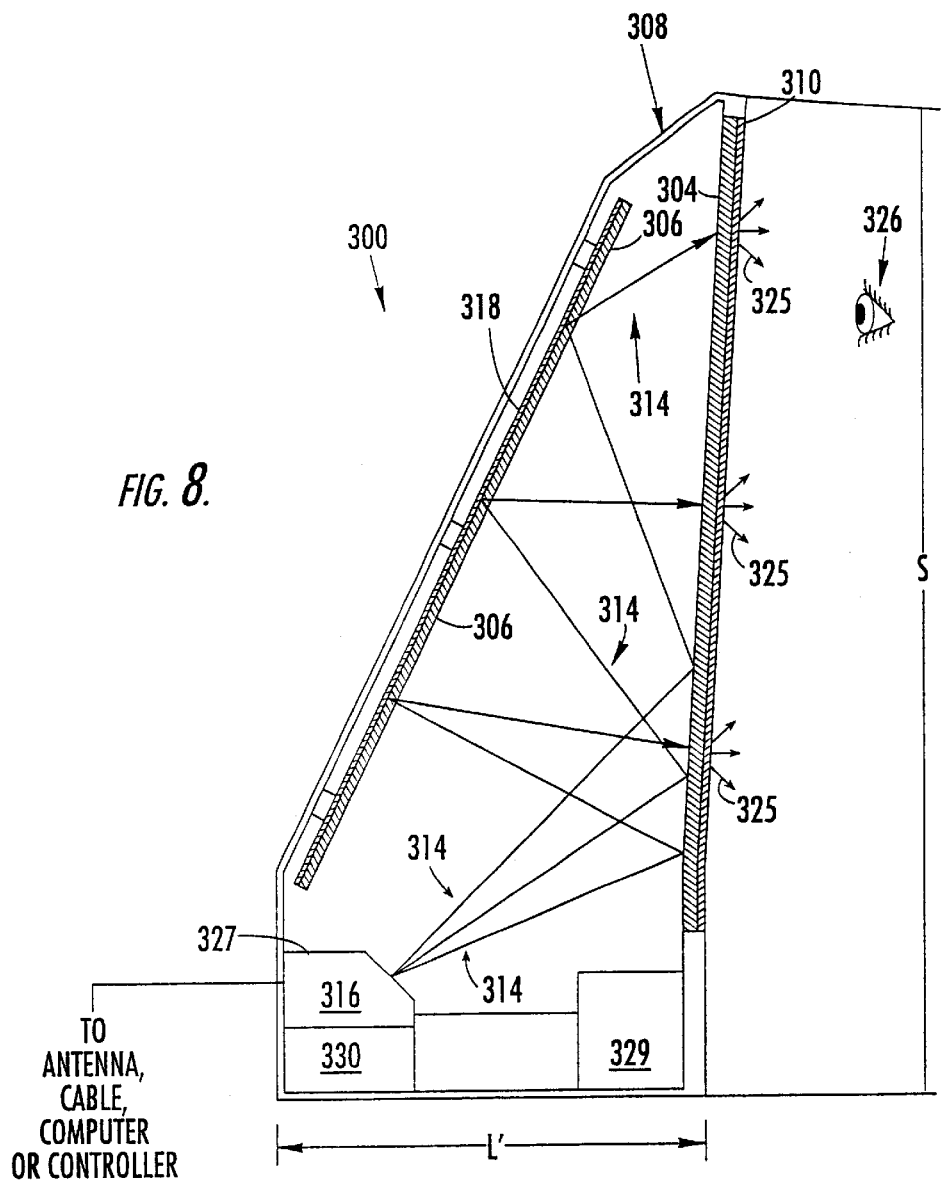
Figure 9:
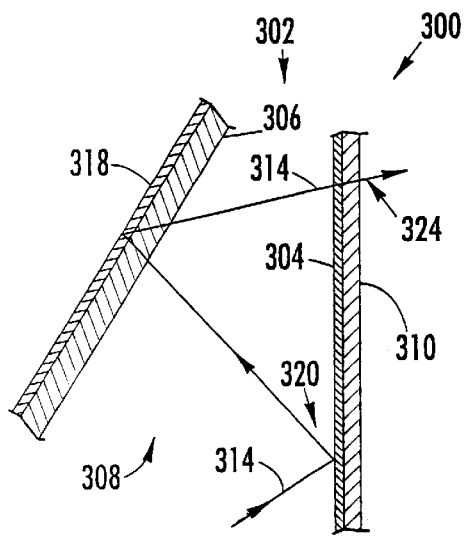
FIG. 9 is a view of a portion of the display system in FIG. 8.

FIGS. 8 and 9 illustrate another rear projection video display system 300 similar to systems described in the aforementioned U.S. patent application Ser. Nos. 08/581,108 and 08/747,190, and European Pat. application No. 96309443.8, EPO 783133A1. The rear projection video display system 300 can advantageously employ the high resolution color image systems 10, 100, or 200 in accordance with embodiments of the invention. The system 300 may be used as part of or in a computer monitor or a television display. The system 300 is also similar to systems described in prior, co-owned U.S. patent application Ser. No. 08/880,178, filed Jun. 20, 1997, by Richard M. Knox, also entitled "Projecting Images" and in concurrently filed, co-owned U.S. patent application Ser. No. 09/239,216, now U.S. Pat. No. 6,238,051, by Austin Huang and Richard M. Knox, entitled "Producing Colored Light Beams From White Light," both incorporated by reference herein in their entirety.

FIG. 9 is a blow-up view illustrating a portion 302 of the rear projection video system 300 shown in FIG. 8. The system 300 includes a reflecting linear polarizer 304 (which may be similar to the reflecting polarizer 18) and an achromatic retarder 306 that form a "folded" optical train or "folded" optics 308 for projecting an image on a display screen 310 (e.g., the display screen 24, which may be a diffuser or diffusive screen). Optical "folding" enables the system 300 (and the system 150 in FIG. 7) to be shallow, i.e., to have a small depth footprint (L in FIG. 7 and L' in FIG. 8 for an apparent projection length), while still projecting a large image. A portion of image light 314 (e.g., the light 25) from an image engine 316 (e.g., in the systems 10, 100, or 200 that produces the light 25) reflects from the reflecting polarizer 304 of the folded optical train 308 at one instance 320 in one polarization state, and then passes through the achromatic retarder 306 with polarization being shifted by approximately 45°. The portion of the image light 314 then reflects from a reflector or mirror 318, passes a second time through the achromatic retarder 306 with polarization being shifted by another approximately 45°, and then passes through the reflecting polarizer 304 to the display screen 310 at another instance 324. The screen 310 scatters the light 314 as light 325 which can be viewed by a viewer 326. The image light 314 being transmitted to the display screen 310 through the intervening folded optical train 308 may be viewed as an alternative to the image light 25 being transmitted to the display 24 in FIGS. 1–3 in the systems 10, 100, and 200 described above. The total polarization shift of approximately 90° due to the double pass through the achromatic retarder 306 allows the portion of the image light to pass through the reflecting polarizer 304 to the display screen 310 for display. The system 300 is suitably arranged for the polarization direction of the image light 314 to be correlated to the intrinsic optical axis of the reflecting polarizer 304 for this occurrence, as will be appreciated by those skilled in the art.

The image engine 316 may include an imager or image source 327 (e.g., in the systems 10, 100, or 200 that produces the light 25) that receives electrical signals through an input cable 328 (from, e.g., the controller 26 or another source), and converts the signals into the primary image beam 314. The types of electrical signals used to create the primary image beam 314 may include television signals, such as those received by an antenna or over cable lines and processed by a video receiver (not shown), and computer video signals generated by a computer system (not shown). The image source 327 may also be included in any conventional image projection engine, such as a liquid crystal display (LCD) projector.

A signal splitter (not shown) and a sound system 329 can also be included in the system 300. The signal splitter divides the electrical signals into, for example, a video signal and an audio signal, and provides these signals to the image engine and the sound system 329, respectively. The image engine converts the video signal into the projected image light 314. The audio signal and the sound system 329 are optional.

In addition to the image source 327, the image engine also includes a light source 330 (e.g., the light source 12) that outputs light (e.g., the light 13 although not shown in FIG. 8). The image source 327 must produce polarized light as its output (e.g., using the polarizer 29 or the reflecting polarizer 18, or using a polarizer in the light source 330). A wide variety of other types of video systems employ polarization in image formation. The light source 330 generates light incident on the image source 327 to create the image light 314. Examples of light sources that may be used as the light source 330 include those described in the aforementioned U.S. Pat. No. 5,404,076 and U.S. patent application Ser. No. 08/747,190, now U.S. Pat. No. 5,833,360 and Ser. No. 08/771,326, now U.S. Pat. No. 6,005,332.

The particular embodiments disclosed above are illustrative only, as the invention may be modified and practiced in different but equivalent manners apparent to those skilled in the art having the benefit of the teachings herein. For example, it will be appreciated by those skilled in the art that any of the systems 10, 100, 200, or 300 could be advantageously employed and support a field sequential color projection or display system. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. An image engine, comprising:
    a first image source having a first response time for color operation at a first color depth, the first response time being greater than operation of the first image source at a second color depth;
    a second image source having a third response time for color operation at the first color depth, the third response time being greater than operation of the second image source at the second color depth;
    a color filter configured to direct first colored light to the first image source and to direct second colored light to the second image source; and
    an electro-optic color switch configured to alternately allow components of the second colored light to be directed to the second image source.

2. The image engine of claim 1, wherein the first colored light comprises red and the second colored light comprises green and blue.

3. The image engine of claim 1, wherein the first colored light and the second colored light comprise red, green and blue light.

4. The image engine of claim 1, wherein the electro-optic color switch is adapted to filter the second colored light.

5. The image engine of claim 1, wherein the electro-optic color switch is adapted to alternate between components of the second colored light under control of a controller device.

6. The image engine of claim 1, wherein the electro-optic color switch comprises an electro-optic shutter.

7. The image engine of claim 1, wherein the electro-optic color switch comprises alternating dichroic reflectors.

8. The image engine of claim 1, wherein the electro-optic color switch is disposed between the color filter and the second image source.

9. The image engine of claim 1, wherein the color filter is disposed between the electro-optic color switch and both the first and second image sources.

10. The image engine of claim 1, wherein the first and second image sources comprise first and second liquid crystal displays.

11. The image engine of claim 1, wherein the first and second image sources comprise first and second ferroelectric liquid crystal displays.

12. The image engine of claim 1, wherein the operation of the first and second image sources at the second color depth comprises three color operation.

13. The image engine of claim 1, wherein the first color depth comprises 6-bit color depth and the second color depth comprises 8-bit color depth.

14. The image engine of claim 1, wherein the second color depth comprises a greater color depth than the first color depth.

15. The image engine of claim 1, wherein the first and second image sources comprise first and second pixel arrays, respectively.

16. The image engine of claim 1, wherein the first and second image sources, the color filter, and the electro-optic color switch are comprised in part of a field sequential color system.

\* \* \* \* \*